(12) United States Patent
Choi

(10) Patent No.: US 7,012,654 B2
(45) Date of Patent: Mar. 14, 2006

(54) FOCUS CONTROL APPARATUS FOR DISPLAY

(75) Inventor: Chi Young Choi, Gumi-si (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 10/156,077

(22) Filed: May 29, 2002

(65) Prior Publication Data

US 2002/0180895 A1 Dec. 5, 2002

(30) Foreign Application Priority Data

Jun. 1, 2001 (KR) ................................ 2001-30664

(51) Int. Cl.
*H04N 3/22* (2006.01)
*H04N 3/26* (2006.01)

(52) U.S. Cl. ..................... 348/745; 348/756; 359/823

(58) Field of Classification Search ................ 348/745, 348/756, 787, 789, 788; 359/823, 825; H04N 3/22, H04N 3/26
See application file for complete search history.

(56) References Cited

U.S. PATENT DOCUMENTS

| | | | | |
|---|---|---|---|---|
| 4,607,924 A | * | 8/1986 | Vance | ......................... 353/101 |
| 5,731,917 A | * | 3/1998 | Inoue | ......................... 359/820 |

* cited by examiner

*Primary Examiner*—Michael H. Lee
(74) *Attorney, Agent, or Firm*—Fleshner & Kim, LLP

(57) ABSTRACT

A focus control apparatus for a display is provided. The focus control apparatus adjusts the focus of a lens through a simple manipulation of an adjusting knob which adjusts a position of a connection tube connecting an image engine and a lens of the apparatus. The focus control apparatus adjusts the focus of the lens by the backward and forward movement of the connection tube, thereby simplifying the structure of the apparatus, improving productivity, and reducing the production cost.

24 Claims, 3 Drawing Sheets

FOCUS CONTROL APPARATUS FOR DISPLAY

BACKGROUND OF THE INVENTION

1. Field of the Invention

The present invention relates to a focus control apparatus comprising an optical engine for a display, and more particularly to a focus control apparatus for a display, in which the focus of a lens of an optical engine is easily adjusted by regulating the position of the lens.

2. Description of the Related Art

FIG. 1a is a schematic view of a conventional display for displaying image information.

With reference to FIG. 1a, the conventional display comprises an optical engine assembly 100, a mirror 200, and a screen 300. The optical engine assembly 100 serves to generate an image. The mirror 200 serves to reflect the image generated by the optical engine assembly 100. The image reflected by the mirror 200 is projected on the screen 300, thereby displaying the image.

The aforementioned conventional display analyzes an image signal transmitted from the external. Then, according to the analyzed image signal, the display generates an image through the optical engine assembly 100.

The image generated by the optical engine assembly 100 is reflected by the mirror 200, which is positioned on the rear of the display. Then, the image reflected by the mirror 200 is projected on the screen 300, which is positioned on the front of the display, thereby being displayed to users. In order to provide a high-quality picture to the users, the image must be exactly projected on the screen 300. The exact projection of the image on the screen 300 is obtained by focusing by the optical engine assembly 100.

FIG. 1b is a schematic view of the optical engine assembly 100 of the conventional display.

Hereinafter, with reference to FIG. 1b, the focus control system of the optical engine assembly 100 is described in detail.

As shown in FIG. 1b, the conventional optical engine assembly 100 comprises an optical engine 110 for generating an image, a lens 120, a connection tube 130, and a ring 140. Herein, the lens 120 serves to project the image generated by the optical engine 110. The connection tube 130 connects the optical engine 110 to the lens 120. The ring 140 serves to adjust the focus of the lens 120.

In order to adjust the focus of the lens 120, the ring 140 is rotated. The lens 120 is protruded from the connection tube 130 or intruded into the connection tube 130 by the rotation of the ring 140. Thereby, the focus of the lens 120 is adjusted.

In order to utilize this focus control system, the rear of the display is opened. Then, a worker puts his or her hand into the display and adjusts the focus of the lens 120 by hand. Therefore, the focusing using the aforementioned focus control system is very difficult and troublesome for the worker. Further, another problem is that it is difficult to check the projected condition of the image on the screen 300.

Moreover, the conventional focus control system additionally requires internal equipment for manipulating the lens 120.

This complicated structure of the display using the aforementioned focus control system causes frequent errors or defects.

Further, the complicated structure of the conventional display increases the production cost.

SUMMARY OF THE INVENTION

Therefore, the present invention has been made in view of the above problems, and it is an object of the present invention to provide a focus control apparatus for a display, in which the focus of a lens of an optical engine is easily adjusted by regulating the position of the lens.

In accordance with the present invention, the above and other objects can be accomplished by the provision of a focus control apparatus for a display, comprising an optical engine assembly including a lens, a connection tube, and an optical engine, a tube coupler connected to the connection tube, a tube adjusting bracket for guiding the movement of the tube coupler, and a focusing handle combined with one end of the connection tube so as to adjust the position of the connection tube.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
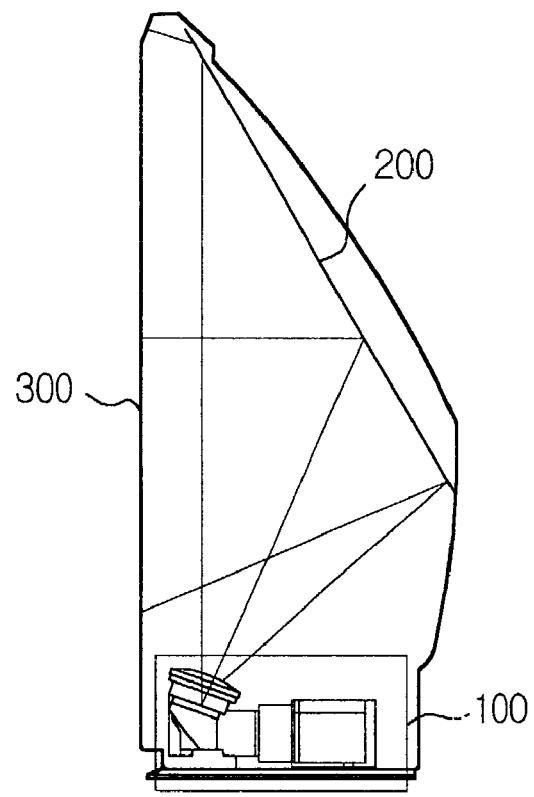
FIG. 1a is a schematic view of a conventional display for displaying image information.
Figure 1B:
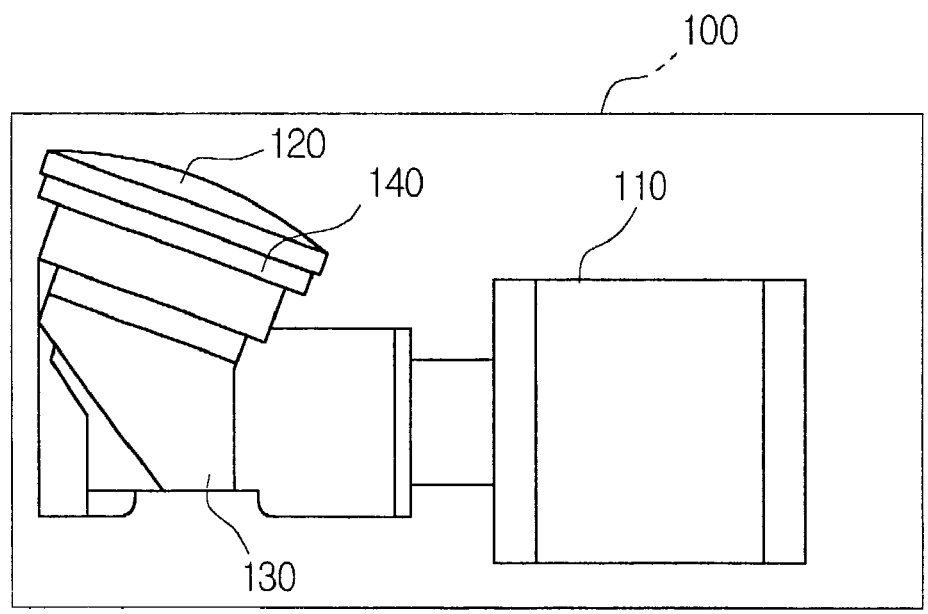
FIG. 1b is a schematic view of an optical engine assembly of the conventional display.
Figure 2:
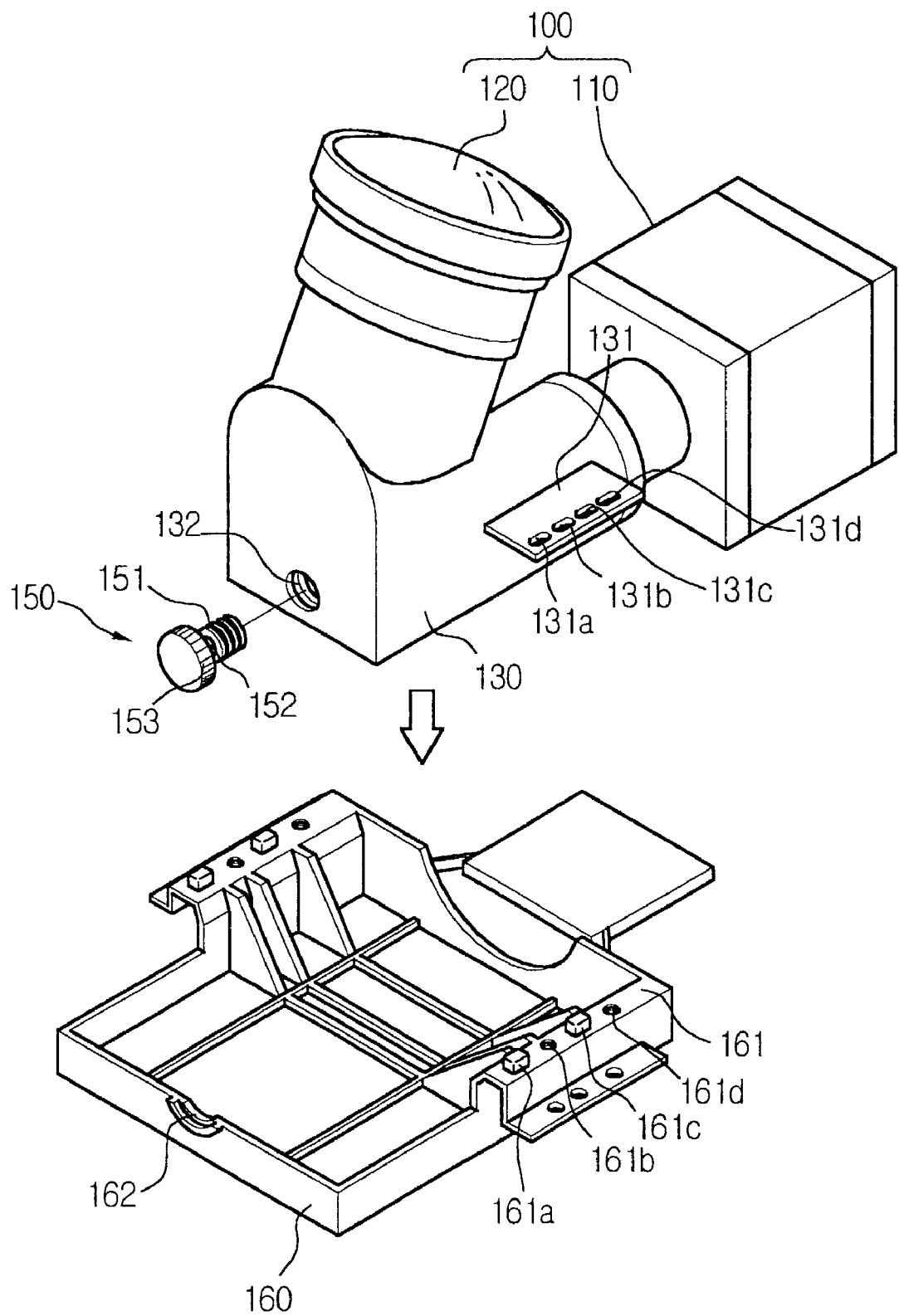
FIG. 2 is an exploded perspective view of a focus control apparatus in accordance with a preferred embodiment of the present invention.

FIG. 2 is an exploded perspective view of a focus control apparatus in accordance with a preferred embodiment of the present invention.

As shown in FIG. 2, the focus control apparatus of the present invention comprises the optical engine assembly 100, a tube coupler 131, a tube-adjusting bracket 160, and a focusing handle 150. Just like the prior art, the optical engine assembly 100 also includes the optical engine 110, the lens 120, and the connection tube 130. The tube coupler 131 is connected to the connection tube 130, and includes bracket fixing holes 131b and 131d and bracket coupling holes 131a and 131c.

The tube-adjusting bracket 160 includes a bracket coupler 161 and a supporter 162 for supporting the focusing handle 150. The focusing handle 150 serves to control the backward and forward movement of the connection tube 130.

The optical engine assembly 100 generates the image signal and then projects the image signal. That is, the optical engine 110 of the optical engine assembly generates the image in response to an inputted signal.

Then, the lens 120 of the optical engine assembly 100 projects the image generated by the optical engines 110. The optical engine 110 and the lens 120 are connected to one of both ends of the connection tube 130, respectively.

An adjusting hole 132 is formed on the rear of the connection tube 130. A screw thread is formed on the inner wall of the adjusting hole 132.

Further, the tube coupler 131 is formed on the connection tube 130.

Preferably, the tube coupler 131 is formed on both sides of the connection tube 130.

The tube coupler 131 includes the bracket fixing holes 131b and 131d and the bracket coupling holes 131a and 131c, thereby being coupled with the tube adjusting bracket 160.

The tube-adjusting bracket 160 includes the bracket coupler 161 and the supporter 162 for supporting the focusing handle 150. The bracket coupler 161 includes tube fixing holes 161b and 161d, and tube coupling protrusions 161a and 161c.

The tube-adjusting bracket 160 supports the connection tube 130, and provides a route for the backward and forward movement of the connection tube 130. The tube fixing holes 161b and 161d of the tube-adjusting bracket 160 correspond to the bracket fixing holes 131b and 131d of the connection tube 130. The tube coupling protrusions 161a and 161c of the tube-adjusting bracket 160 correspond to the bracket coupling holes 131a and 131c of the connection tube 130.

That is, in order to couple the connection tube 130 with the tube adjusting bracket 160 as well as to make the connection tube 130 move backward and forward above the tube adjusting bracket 160 so as to adjust the focus of the lens 120, long holes are formed on one of the tube coupler 131 of the connection tube 130 and the bracket coupler 161 of the tube adjusting bracket 160, and protrusions are formed on the other one of the tube coupler 131 of the connection tube 130 and the bracket coupler 161 of the tube adjusting bracket 160.

Alternatively, the long holes and the protrusions may be formed on one of the tube coupler 131 of the connection tube 130 and the bracket 161 of the tube adjusting bracket 160, and the protrusions and the long holes may be formed on the other one of the tube coupler 131 of the connection tube 130 and the bracket coupler 161 the tube adjusting bracket 160. That is, the long holes of the tube coupler 131 correspond to the protrusions of the bracket coupler 161, and the protrusions of the tube coupler 131 correspond to the long holes of the bracket coupler 161.

The focusing handle 150 comprises a knob 153, a screw neck 152, and an adjusting screw 151.

Herein, the knob 153 is placed outside one end of the tube-adjusting bracket 160.

The screw neck 152 for connecting the adjusting screw 151 of the focusing handle 150 to the knob 153 is laid on the supporter 162 of the tube-adjusting bracket 160.

By the screw neck 152 laid on the supporter 162, the focusing handle 150 does not move backward and forward, but rotates. Therefore, when the focusing handle 150 is rotated, only the connection tube 130 moves backward and forward.

The adjusting neck 151 has a thread on its outer wall. Therefore, the adjusting neck 151 is inserted into the adjusting hole 132 of the connection tube 130. Thereby, the connection tube 130 moves backward and forward by the rotation of the adjusting screw 151.

The screw neck 152 separates the knob 153 of the focusing handle 150 from the supporter 162 of the tube-adjusting bracket 160 by a designated distance. Therefore, users can easily manipulate the focusing handle 150.

Figure 3:
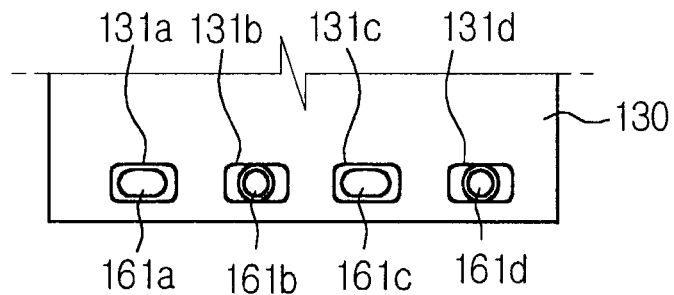
FIG. 3 is a plan and cross-sectional views showing an engagement of a connection tube and a tube adjusting bracket of the focus control apparatus in accordance with a preferred embodiment of the present invention.
Figure 3:
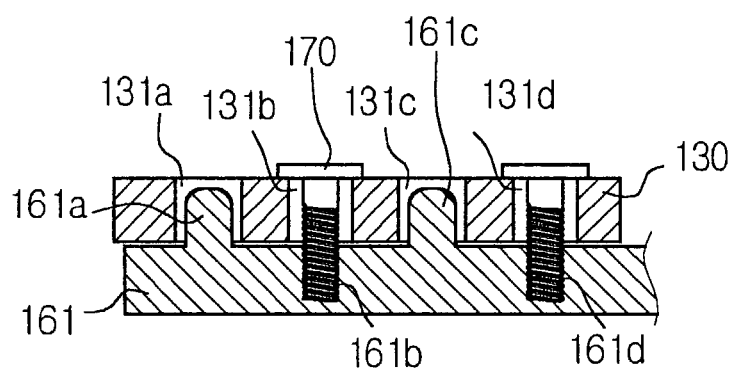

FIG. 3 is a plan and cross-sectional views showing an engagement of the connection tube and the tube-adjusting bracket of the focus control apparatus in accordance with a preferred embodiment of the present invention.

Hereinafter, with reference to FIG. 3, the movement of the connection tube 130 is described in detail.

The bracket fixing holes 131b and 131d of the tube coupler 131 are engaged with the tube fixing holes 161b and 161d of the bracket coupler 161.

Further, the bracket coupling holes 131a and 131c of the tube coupler 131 are engaged with the tube coupling protrusions 161a and 161c of the bracket coupler 161.

Differing from the prior art, this preferred embodiment of the present invention employs a focus control system, in which the focus of the lens is not adjusted by the protrusion and intrusion of the lens, but is rather adjusted by the backward and forward movement of the connection tube.

Therefore, the bracket coupling holes 131a and 131c of the tube coupler 131 are larger than the tube coupling protrusions 161a and 161c of the bracket coupler 161 so that the connection tube 130 moves backward and forward above the tube adjusting bracket 160.

That is, the connection tube 130 moves backward and forward above the tube-adjusting bracket 160 by the difference of the size between the bracket coupling holes 131a and 131c of the tube coupler 131 and the tube coupling protrusions 161a and 161c of the bracket coupler 161.

Herein, the connection tube 130 is coupled with the tube-adjusting bracket 160 by engaging the bracket fixing holes 131b and 131d of the tube coupler 131 with the tube fixing holes 161b and 161d of the bracket coupler 161 by screws 170.

Preferably, the screws 170 are installed on the bracket fixing holes 131b and 131d of the tube coupler 131 and the tube fixing holes 161b and 161d of the bracket coupler 161 so that the connection tube 130 smoothly moves backward and forward.

Further, preferably, the screws 170 are installed on the bracket fixing holes 131b and 131d of the tube coupler 131 and the tube fixing holes 161b and 161d of the bracket coupler 161 so that the tube coupler 131 of the connection tube 130 is not separated from the bracket coupler 161 of the tube adjusting bracket 160 by any external impact.

Figure 4:
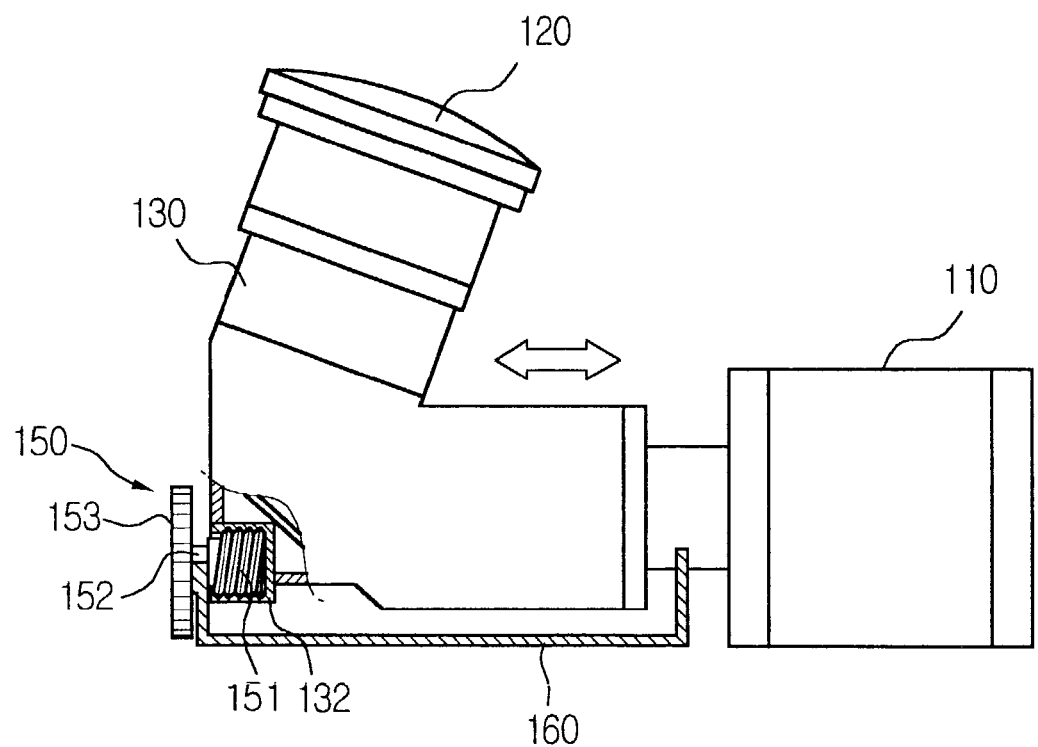
FIG. 4 is a schematic view showing the operation of the focus control apparatus in accordance with a preferred embodiment of the present invention.

FIG. 4 shows the operation of the focus control apparatus in accordance with a preferred embodiment of the present invention.

Hereinafter, with reference to FIG. 4, the operation of the focus control apparatus of the present invention is described in detail.

When the knob 153 is rotated by an external force, the screw neck 152 and the adjusting screw 151 connected to the knob 153 are also rotated.

The rotation of the adjusting screw 151 moves the adjusting holes 132, into which the adjusting screw 151 is inserted, backward and forward, thereby moving the connection tube 130 backward and forward.

Herein, the screw neck 152 of the focusing handle 150 is laid on the supporter 162 of one end of the tube-adjusting bracket 160, and the optical engine 110 is placed on the other end of the tube-adjusting bracket 160.

The focus control apparatus of the present invention effectively adjusts the focus of the lens using the adjusting handle by a simple manipulation.

Further, the focus control apparatus of the present invention is simply operated by adjusting the focus of the lens not by the protrusion and the intrusion of the lens, but by the backward and forward movement of the connection tube, thereby improving the productivity and reducing the production cost.

Further, the present invention implements another preferred embodiment.

In accordance with another embodiment of the present invention, a focus control apparatus comprises the optical engine assembly including the lens, the connection tube, and the optical engine, the tube coupler connected to the connection tube, the tube adjusting bracket including guiding means for guiding the movement of the connection tube.

The guiding means is formed on a contact surface between the connection tube and the tube-adjusting bracket. Preferably, the guiding means is a rail formed on the contact surface.

The focus control apparatus of this embodiment of the present invention further comprises fixing means. The fixing means is formed on a contact surface between the tube coupler and the tube-adjusting bracket. The fixing means serves to firmly fix the connection tube to the tube-adjusting bracket. Thereby, the connection tube is not shaken even by any external impact. Preferably, a bolt and a slot for inserting the bolt or a bolt and a nut for fixing the bolt are used as the fixing means.

Further, the connection tube moves not only by the aforementioned focusing handle but also by hand or by an electromagnetic force.

As apparent from the above description, the focus control apparatus adjusts the focus of the lens not by the protrusion and the intrusion of the lens but by the backward and forward movement of the connection tube, thereby simplifying the structure of the display using the focus control apparatus.

Further, the present invention decreases the number of the steps of the manufacturing process, thereby reducing the production cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A focus control apparatus for a display, said apparatus comprising:
    an optical engine assembly including a lens, a connection tube, and an optical engine;
    a tube coupler connected to the connection tube;
    a tube adjusting bracket configured to guide a movement of the tube coupler; and
    a focusing handle combined with one end of the connection tube and configured to draw the connection tube toward or move the connection tube away from the focusing handle in a longitudinal direction of the connection tube so as to adjust a position of the connection tube.

2. The focus control apparatus as set forth in claim 1, further comprising:
    at least one hole formed in the tube coupler; and
    at least one protrusion formed on the tube-adjusting bracket corresponding to the at least one hole formed in the tube coupler, wherein the at least one hole of the tube coupler is configured to be engaged with the at least one corresponding protrusion of the tube-adjusting bracket so as to allow the connection tube to move backward and forward with respect to the tube-adjusting bracket.

3. The focus control apparatus as set forth in claim 1, further comprising:
    at least one first hole and at least one first protrusion formed on the tube coupler; and
    at least one second hole and at least one second protrusion formed on the tube-adjusting bracket, wherein the at least one first hole and the at least one second protrusion are configured to be engaged and the at least one first protrusion and the at least one second hole are configured to be engaged so as to allow the connection tube to move backward and forward with respect to the tube adjusting bracket.

4. The focus control apparatus as set forth in claim 1, wherein said focusing handle comprises:
    a knob positioned at an end of the tube-adjusting bracket;
    a screw neck positioned on a support portion formed on the tube adjusting bracket; and
    an adjusting screw configured to be inserted into the connection tube so as to cause the connection tube to move backward and forward in response to a rotation of the adjusting screw.

5. A focus control apparatus for a display, said apparatus comprising:
    an optical engine assembly including a lens, a connection tube, and an optical engine;
    a tube coupler connected to the connection tube; and
    a tube-adjusting bracket including a guide configured to guide a movement of the connection tube in response to a rotation of a focusing handle provided at an end portion of the connection tube.

6. The focus control apparatus as set forth in claim 5, wherein said guide comprises a rail formed on a contact surface of the connection tube and the tube-adjusting bracket.

7. The focus control apparatus as set forth in claim 5, wherein said tube adjusting bracket is positioned below the tube coupler.

8. The focus control apparatus as set forth in claim 5, further comprising a fastening device provided at a contact surface of the tube coupler and the tube adjusting bracket and configured to attach the tube coupler and the tube adjusting bracket.

9. The focus control apparatus as set forth in claim 8, wherein said fastening device comprises bolts and nuts.

10. The focus control apparatus as set forth in claim 1, wherein the tube coupler comprises a pair of tube coupling portions positioned on opposite sides of the connection tube.

11. The focus control apparatus as set forth in claim 10, wherein the tube adjusting bracket comprises a pair of bracket couplers formed on opposite sides of the tube adjusting bracket corresponding to the pair of tube coupling portions.

12. The focus control apparatus as set forth in claim 1, wherein the focusing handle is a screw.

13. The focus control apparatus as set forth in claim 2, wherein the connection tube is positioned above the tube adjusting bracket.

14. The focus control apparatus as set forth in claim 2, wherein at least one dimension of the at least one hole formed in the tube coupler is greater than a corresponding dimension of a corresponding protrusion formed on the tube adjusting bracket so as to allow limited movement of the protrusion within the hole when engaged.

15. The focus control apparatus as set forth in claim 14, wherein the at least one hole formed in the tube coupler is substantially elliptical.

16. The focus control apparatus as set forth in claim 2, wherein the at least one hole formed in the tube coupler comprises at least one first hole configured to be engaged with a corresponding protrusion formed on the tube adjusting bracket.

17. The focus control apparatus as set forth in claim 16, wherein the at least one hole formed in the tube coupler further comprises at least one second hole formed in the tube coupler and configured to align with a corresponding hole formed in the tube adjusting bracket.

18. The focus control apparatus as set forth in claim 17, further comprising a fastener configured to extend through the at least one second hole and into the corresponding hole formed in the tube adjusting bracket so as to attach the tube connector and the tube adjusting bracket.

19. The focus control apparatus as set forth in claim 18, wherein the fastener comprises a threaded screw, and wherein and end thereof is configured to be threadably engaged with the corresponding hole formed in the tube adjusting bracket.

20. The focus control apparatus as set forth in claim 3, wherein at least one dimension of the at least one first hole is greater than a corresponding dimension of its respective second protrusion so as to allow limited movement of the second protrusion within the first hole.

21. The focus control apparatus as set forth in claim 4, further comprising a threaded adjustment hole formed in the connection tube and configured to threadably engage a corresponding threading formed on the adjusting screw.

22. The focus control apparatus as set forth in claim 5, wherein the focusing handle is a screw.

23. The focus control apparatus as set forth in claim 8, wherein the fastening device is configured to preclude separation of the tube coupler and the tube adjusting bracket due to an externally applied impact.

24. The focus control apparatus as set forth in claim 8, wherein the fastening device is configured to slidably attach the tube coupler and the tube adjusting bracket so as to allow the connection tube to move backward and forward relative to the tube adjusting bracket.

* * * * *